(12) United States Patent
Diao et al.

(10) Patent No.: US 11,920,714 B2
(45) Date of Patent: Mar. 5, 2024

(54) SEALING STRUCTURE

(71) Applicants: RIFENG ENTERPRISE (FOSHAN) CO., LTD., Guangdong (CN); RIFENG ENTERPRISE GROUP CO., LTD., Guangdong (CN); RiFeng New Material Co., Ltd., Guangdong (CN)

(72) Inventors: Zhenbin Diao, Guangdong (CN); Ximin Li, Guangdong (CN); Xiyong Lin, Guangdong (CN); Jiajia Cheng, Guangdong (CN); Wenfeng Chen, Guangdong (CN); Huijian Cao, Guangdong (CN); Ali Chen, Guangdong (CN)

(73) Assignees: RIFENG ENTERPRISE (FOSHAN) CO., LTD., Foshan (CN); RIFENG ENTERPRISE GROUP CO., LTD., Foshan (CN); RiFeng New Material Co., Ltd., Foshan (CN)

( * ) Notice: Subject to any disclaimer, the term of this patent is extended or adjusted under 35 U.S.C. 154(b) by 306 days.

(21) Appl. No.: 17/295,044

(22) PCT Filed: Jun. 5, 2020

(86) PCT No.: PCT/CN2020/094770
§ 371 (c)(1),
(2) Date: May 19, 2021

(87) PCT Pub. No.: WO2021/093316
PCT Pub. Date: May 20, 2021

(65) Prior Publication Data
US 2022/0307636 A1    Sep. 29, 2022

(30) Foreign Application Priority Data
Nov. 15, 2019   (CN) .......................... 201911124319.4

(51) Int. Cl.
*F16L 37/092* (2006.01)
*F16L 37/088* (2006.01)
*F16L 37/091* (2006.01)

(52) U.S. Cl.
CPC ......... *F16L 37/0925* (2013.01); *F16L 37/088* (2013.01); *F16L 37/091* (2013.01); *F16L 37/0926* (2019.08); *F16L 2201/10* (2013.01)

(58) Field of Classification Search
CPC ... F16L 37/0925; F16L 37/088; F16L 37/091; F16L 37/0926; F16L 2201/10;
(Continued)

(56) References Cited

U.S. PATENT DOCUMENTS

| | | | | |
|---|---|---|---|---|
| 7,404,581 B2 * | 7/2008 | Baving | ................. | F16L 33/227 277/626 |
| 8,789,853 B2 * | 7/2014 | Gershkovich | ....... | F16L 37/0925 285/249 |

(Continued)

FOREIGN PATENT DOCUMENTS

| | | |
|---|---|---|
| CN | 1596353 A | 3/2005 |
| JP | 2008208893 A | 9/2008 |

*Primary Examiner* — David Bochna

(57) ABSTRACT

A sealing structure includes an inner pipe, an outer pipe, and a sealing ring, where the outer pipe is detachably sleeved on the inner pipe, a slot for inserting a pipe is formed between an inner wall of the outer pipe and an outer wall of the inner pipe, and the outer wall of the inner pipe is provided with a sealing groove for placing the sealing ring; the sealing ring includes a main body provided with a lip; the sealing groove includes a first sealing groove and a second sealing groove, the first sealing groove and the second sealing groove are stepped; the bottom of the lip fits the bottom of the first sealing groove; and the bottom of the main body fits the bottom of the second sealing groove.

17 Claims, 3 Drawing Sheets

(58) Field of Classification Search
CPC ....... F16L 37/025; F16L 21/035; F16L 21/04; F16L 37/092; F16L 33/222
See application file for complete search history.

(56) References Cited

U.S. PATENT DOCUMENTS

| | | | |
|---|---|---|---|
| 10,837,582 B1* | 11/2020 | Hegler | F16L 21/03 |
| 2002/0163191 A1* | 11/2002 | Muenster | F16L 37/0926 285/331 |
| 2007/0001454 A1* | 1/2007 | Baving | F16L 37/091 285/322 |

* cited by examiner

SEALING STRUCTURE

TECHNICAL FIELD

The present disclosure relates to the field of sealing technologies, and in particular, to a sealing structure.

BACKGROUND

In the pipeline industry, the connection between pipes needs to be rapidly established and removed to facilitate maintenance, and has good sealing performance. At present, 0-shaped rings are widely used to seal pipe joints such as clamp-type pipe joints, nut-based ferrule-type pipe joints, and pipe joints that can be manually inserted without any tool. Before a pipe joint is installed on a pipe, ends of the pipe need to be rounded and chamfered when above sealing manners are adopted. These processes are complex, resulting in a cumbersome, time-consuming, and high-cost installation process. In addition, it is necessary to avoid cutting the ends of the pipe improperly; otherwise, when the pipe is inserted into the pipe joint, it is very easy to crush a sealing ring or push the sealing ring out of a sealing groove, invalidating sealing performance of the sealing ring and resulting in a poor sealing effect. Moreover, if an installation worker forgets to round or chamfer the ends of the pipe, sealing performance of a pipe connection may easily fail to meet use requirements. This will cause leakage of high-pressure fluid, resulting in losses.

SUMMARY

The present disclosure aims to provide a sealing structure to resolve at least one of the foregoing problems.

The present disclosure provides a sealing structure, including an inner pipe, an outer pipe, and a sealing ring, wherein the outer pipe is detachably sleeved on the inner pipe, a slot for inserting a pipe is formed between an inner wall of the outer pipe and an outer wall of the inner pipe, and the outer wall of the inner pipe is provided with a sealing groove for placing the sealing ring; the sealing ring includes a main body provided with a lip; the sealing groove includes a first sealing groove and a second sealing groove, the first sealing groove and the second sealing groove are stepped, and a depth of the first sealing groove is less than that of the second sealing groove; the bottom of the lip fits the bottom of the first sealing groove, a thickness of the lip in a non-compressed state is greater than the depth of the first sealing groove, and a width of the lip in the non-compressed state is less than that of the first sealing groove; and the bottom of the main body fits the bottom of the second sealing groove, and a thickness of the main body in the non-compressed state is less than or equal to the depth of the second sealing groove.

Further, a width of the main body in the non-compressed state is less than that of the second sealing groove, and/or a cross-section of the lip is round, square, or triangular.

Further, the sealing structure includes the pipe, where the pipe is clamped between the outer pipe and the inner pipe.

Further, the sealing ring is made of an elastic material.

Further, the inner pipe is a left-right symmetrical structure, and each of the left and right parts of the inner pipe is sleeved with one outer pipe.

Further, there are a plurality of sealing grooves and correspondingly, a plurality of sealing rings.

The present disclosure further provides a sealing structure, including an inner pipe and at least one sealing ring, wherein an outer wall of the inner pipe is provided with at least one sealing groove, each sealing ring is nested in a corresponding sealing groove, and the inner pipe can be sealingly connected, through a compressive deformation of the sealing ring, to the pipe inserted outside the inner pipe; the sealing ring includes a main body and a lip extending along an inserting direction of the pipe from a radially inner side of a first end of the main body; the sealing groove includes a first sealing groove and a second sealing groove, the lip is nested in the first sealing groove, and the main body is nested in the second sealing groove; a step for preventing an axial movement of the main body is formed between the first sealing groove and the second sealing groove; when the sealing ring is in a non-compressed state, an outer diameter of a second end of the main body is less than an inner diameter of the pipe, a maximum outer diameter of the lip is greater than the inner diameter of the pipe, and an axial length of the lip is less than the width of the first sealing groove; a peripheral wall of the sealing ring is provided with a guide surface for guiding insertion of the pipe, and the guide surface is disposed between a position indicated by the maximum outer diameter of the lip and the second end of the main body; and when the sealing ring is compressed by the pipe, the lip is squeezed, and has a first sealing surface in contact with a bottom surface of the first sealing groove and a second sealing surface in contact with an inner wall of the pipe.

Further, the guide surface is a truncated cone surface or an arc surface, or the guide surface is composed of a truncated cone surface and an arc surface.

Further, the sealing structure includes an outer pipe, where a first end of the outer pipe is connected to the inner pipe, a slot is formed between an inner wall of the outer pipe and the outer wall of the inner pipe, and a second end of the outer pipe is separated from an end of the inner pipe to form an opening for inserting the pipe into the slot.

Further, the sealing structure includes the pipe, wherein the pipe is inserted into the slot and clamped between the outer pipe and the inner pipe, and the sealing ring is squeezed by the pipe and is in a compressed state.

Further, when the sealing ring is in the non-compressed state, an axial length of the main body is less than a width of the second sealing groove.

Further, when the sealing ring is in the non-compressed state, a surface of a free end of the lip is a curved surface, and preferably, an inner surface of the lip has a cylindrical surface that fits the bottom surface of the first sealing groove, and the first sealing surface includes the cylindrical surface.

Further, the first end of the outer pipe is detachably connected to the inner pipe.

Further, the outer wall of the inner pipe is provided with a flange and a clamping groove that are axially spaced, an elastic snap ring is installed in the clamping groove, and the first end of the outer pipe is provided with a part clamped between the flange and the elastic snap ring.

Further, the flange is disposed outside the slot, and the elastic snap ring is disposed inside the slot.

Further, the outer pipe and the inner pipe are of an integral structure.

Further, the sealing structure includes an indication ring disposed inside the slot, wherein the indication ring is pushed by the pipe to cross the lip, and the outer pipe is provided with an observation hole for observing whether the indication ring is moved into the position where it should be.

Further, the indication ring is a colored indication ring.

Further, the sealing structure includes a protective cover for closing an opening of the slot and ends of the inner pipe.

Compared with the prior art, the sealing structure in embodiments of the present disclosure has the following beneficial effects.

During assembling, the sealing ring is first sleeved on the inner pipe to place the sealing ring in the sealing groove, then the outer pipe is sleeved on the inner pipe, and finally the pipe is inserted into the slot. The thickness of the main body in the non-compressed state is less than or equal to the depth of the second sealing groove. Therefore, the pipe can be smoothly sleeved on the sealing ring. In addition, the ends of the pipe do not need to be chamfered in advance, and it is not easy to squeeze the sealing ring out of the sealing groove in the process of inserting the pipe, thereby effectively protecting the sealing ring. Moreover, the thickness of the lip in the non-compressed state is greater than the depth of the first sealing groove, so that the pipe and the sealing groove are sealingly connected through the sealing ring, achieving a good sealing effect. In addition, when high-pressure fluid enters a gap between the inner pipe and the pipe in the direction from the main body to the lip, the high-pressure fluid squeezes the sealing ring inwards to make the main body abut against a wall, close to the first sealing groove, of the second sealing groove. In this case, the inner and outer surfaces of the lip closely fit the inner wall of the pipe and the bottom of the first sealing groove respectively after being squeezed by the pipe and the high-pressure fluid. When the high-pressure fluid enters the gap between the inner pipe and the pipe in the direction from the lip to the main body, the high-pressure fluid squeezes the sealing ring outwards to make the main body abut against a wall, far away from the first sealing groove, of the second sealing groove. In this case, the inner and outer surfaces of the lip closely fit the inner wall of the pipe and the bottom of the first sealing groove respectively after being squeezed by the pipe and the high-pressure fluid. In this way, regardless of the direction from which the high-pressure fluid flows to enter the gap between the inner pipe and the pipe, the sealing ring can closely fit the sealing groove and the pipe, thereby achieving a good sealing effect and preventing leakage and infiltration of the high-pressure fluid effectively.

DETAILED DESCRIPTION

The specific implementations of the present disclosure are described in more detail below with reference to the accompanying drawings and embodiments. The following embodiments are intended to illustrate the present disclosure, rather than to limit the scope of the present disclosure.

It should be understood that, in the description of the present disclosure, terms such as "center", "longitudinal", "transverse", "upper", "lower", "front", "rear", "left", "right", "vertical", "horizontal", "top", "bottom", "inner", and "outer" indicate the orientation or position relationships based on the drawings. They are merely intended to facilitate description of the present disclosure, rather than to indicate or imply that the mentioned device or elements must have a specific orientation and must be constructed and operated in a specific orientation. Therefore, these terms should not be construed as a limitation to the present disclosure. Moreover, the terms such as "first", "second" and "third" are used only for the purpose of description and are not intended to indicate or imply relative importance.

Figure 1:
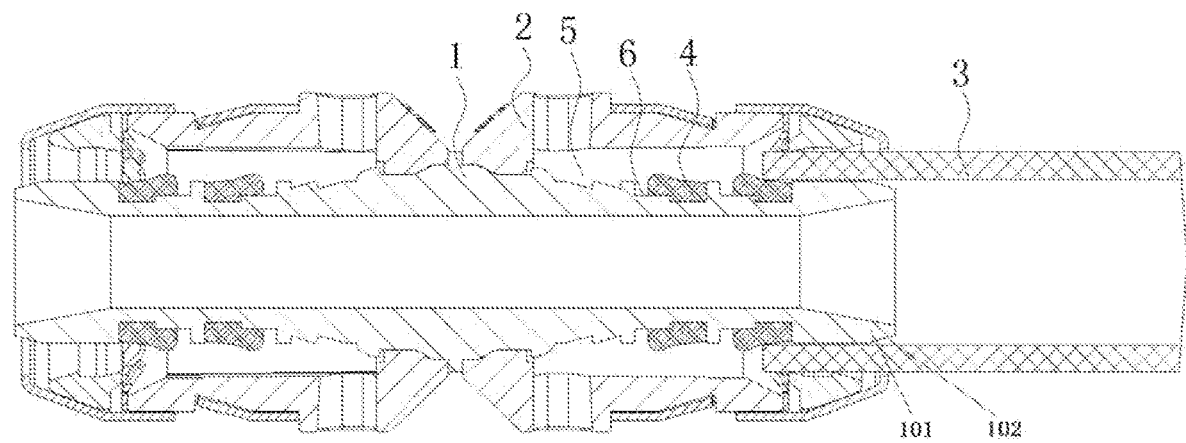
FIG. 1 is a sectional view of a sealing structure according to a first embodiment of the present disclosure.
Figure 2:
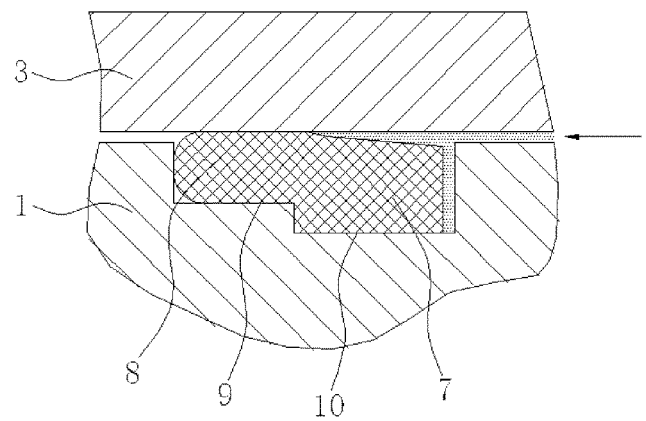
FIG. 2 is a local sectional view of high-pressure fluid entering a gap between an inner pipe and a pipe in FIG. 1 from a main body to a lip.
Figure 3:
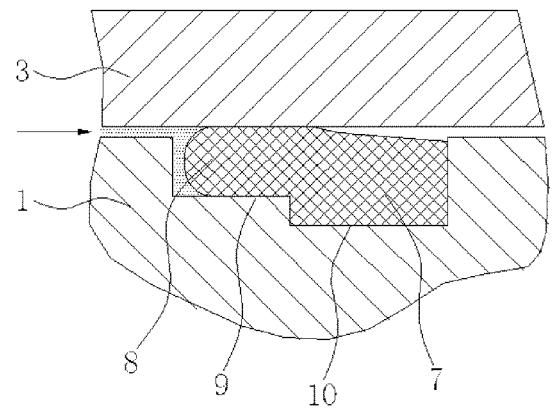
FIG. 3 is a local sectional view of high-pressure fluid entering a gap between an inner pipe and a pipe in FIG. 1 from a lip to a main body.

As shown in FIG. 1 to FIG. 3, in a preferred embodiment, a sealing structure according to a first embodiment of the present disclosure includes an inner pipe 1, an outer pipe 2, a pipe 3, and a sealing ring 4.

The outer pipe 2 is detachably sleeved on the inner pipe 1. For example, a first end of the outer pipe 2 is detachably connected to the inner pipe 1. A slot 5 for inserting the pipe 3 is formed between an inner wall of the outer pipe 2 and an outer wall of the inner pipe 1. The inner pipe 1 has an inserting end 101. A second end of the outer pipe 2 is separated from the inserting end 101 of the inner pipe 1 to form an opening 102 for inserting the pipe 3 into the slot 5. The outer wall of the inner pipe 1 is provided with a sealing groove 6 for placing the sealing ring 4. When the pipe 3 is inserted into the slot 5 through the opening 102 to be sleeved outside the inner pipe 1, for example, the pipe 3 gradually crosses the sealing ring 4 and applies force on the sealing ring 4, then the sealing ring 4 is compressed and deformed (radially contracted and axially expanded) under the force, and the pipe 3 is tightly clamped between the outer pipe 2 and the inner pipe 1, thereby realizing a sealing connection between the inner pipe 1 and the pipe 3. When the pipe 3 is not sleeved on the inner pipe 1, the sealing ring 4 is in a non-compressed state.

The sealing ring 4 includes a main body 7 provided with a lip 8. The lip 8 extends along an inserting direction of the pipe 3 from a radially inner side of a first end of the main body 7. The inserting direction is a direction of inserting the pipe 3 outside the inner pipe 1, and is opposite to a direction of pulling the pipe 3 out of the inner pipe 1. The sealing groove 6 includes a ring-shaped first sealing groove 9 and a ring-shaped second sealing groove 10. The first sealing groove 9 and the second sealing groove 10 are connected in a stepped manner to form a step for preventing the main body 7 from axially moving leftwards. In this embodiment, a depth of the first sealing groove 9 is less than that of the second sealing groove 10, and the first sealing groove 9 is farther away from the inserting end 101 than the second sealing groove 10. It can be understood that the depth of the sealing groove 6 is a depth of the sealing groove 6 in a radial direction of the inner pipe 1.

The lip 8 is nested in the first sealing groove 9. The bottom of the lip 8 fits the bottom of the first sealing groove 9, and a thickness of the lip 8 in the non-compressed state is greater than the depth of the first sealing groove 9, in other words, a maximum outer diameter of the lip 8 is greater than an inner diameter of the pipe 3. A width (axial length) of the lip 8 in the non-compressed state is less than that of the first sealing groove 9. The main body 7 is nested in the second sealing groove 10. The bottom of the main body 7 fits the bottom of the second sealing groove 10. A thickness of the main body 7 in the non-compressed state is less than or equal to the depth of the second sealing groove 10. When the sealing ring 4 is in the non-compressed state, an outer diameter of a second end of the main body 7 is less than the inner diameter of the pipe 3. It can be understood that width directions of the sealing ring 4 and the sealing groove 6 are consistent with an axial direction of the inner pipe 1.

A peripheral wall of the sealing ring 4 is provided with a guide surface for guiding insertion of the pipe 3, and the guide surface is disposed between a position indicated by the maximum outer diameter of the lip 8 and the second end of the main body 7. The guide surface makes it convenient for the pipe 3 to cross the highest point of the sealing ring 4, and presents the sealing ring 4 from being squeezed out of the sealing groove 6 easily. In this way, the ends of the pipe 3 do not need to be chamfered, thereby simplifying the process and reducing costs. Further, the guide surface is a truncated cone surface or an arc surface, or the guide surface is composed of a truncated cone surface and an arc surface. Further, a peripheral surface of the main body 7 is an inclined surface (truncated cone surface). As shown in FIG. 2, when the sealing ring 4 is compressed by the pipe 3, the lip 8 is squeezed, and has a first sealing surface in contact with a bottom surface of the first sealing groove 9 and a second sealing surface in contact with an inner wall of the pipe 3.

A cross-section of the lip 8 is round, square, or triangle, or is in any other proper shape. In some embodiments, when the sealing ring 4 is in the non-compressed state, a surface of a free end of the lip 8 is a curved surface.

In some embodiments, when the sealing ring 4 is in the non-compressed state, the surface of the lip 8 has a curved surface connected to the peripheral surface of the main body 7. There is a smooth transition between the curved surface and the peripheral surface of the main body 7, and the curved surface is used to be in contact with the inner wall of the pipe 3. In some embodiments, the inner surface of the lip 8 has a cylindrical surface that fits the bottom surface of the first sealing groove 9, and the first sealing surface includes the cylindrical surface.

During assembling, the sealing ring 4 is first sleeved on the inner pipe 1 and placed in the sealing groove 6, then the outer pipe 2 is sleeved on the inner pipe 1, and finally the pipe 3 is inserted into the slot 5. The outer diameter of the second end of the main body 7 is less than the inner diameter of the pipe 3, and the peripheral wall of the sealing ring 4 has the guide surface. Therefore, the pipe 3 can be smoothly sleeved on the sealing ring 4. In addition, the ends of the pipe 3 do not need to be chamfered in advance, and it is not easy to squeeze the sealing ring 4 out of the sealing groove 6 in the process of inserting the pipe 3, thereby effectively protecting the sealing ring 4. In this way, the chamfering process can be skipped, the pipe connection process is safe, reliable, and cost-effective, and rapid and easy assembling can be realized. Moreover, the thickness of the lip 8 in the non-compressed state is greater than the depth of the first sealing groove 9, so that the pipe 3 and the sealing groove 6 are sealingly connected through the sealing ring 4, achieving a good sealing effect.

In addition, as shown in FIG. 2, a direction indicated by an arrow is a flow direction of high-pressure fluid. When the high-pressure fluid enters a gap between the inner pipe 1 and the pipe 3 in the direction from the main body 7 to the lip 8, the high-pressure fluid squeezes the sealing ring 4 inwards to make the main body 7 abut against a wall, close to the first sealing groove 9, of the second sealing groove 10. In this case, the inner and outer surfaces (the first sealing surface and the second sealing surface) of the lip 8 closely fit the inner wall of the pipe 3 and the bottom of the first sealing groove 9 respectively after being squeezed by the pipe 3 and the high-pressure fluid.

As shown in FIG. 3, a direction indicated by an arrow is a flow direction of the high-pressure fluid. When the high-pressure fluid enters the gap between the inner pipe 1 and the pipe 3 in the direction from the lip 8 to the main body 7, the high-pressure fluid squeezes the sealing ring 4 outwards to make the main body 7 abut against a wall, far away from the first sealing groove 9, of the second sealing groove 10. In this case, the inner and outer surfaces (the first sealing surface and the second sealing surface) of the lip 8 closely fit the inner wall of the pipe 3 and the bottom of the first sealing groove 9 respectively after being squeezed by the pipe 3 and the high-pressure fluid.

It can be learned with reference to FIG. 2 and FIG. 3 that, regardless of the direction from which the high-pressure fluid enters the gap between the inner pipe 1 and the pipe 3, the sealing ring 4 can closely fit the sealing groove 6 and the pipe 3, thereby achieving a good sealing effect and preventing leakage and infiltration of the high-pressure fluid effectively.

For example, when the sealing ring is in the non-compressed state, a width (axial length) of the main body 7 is less than that of the second sealing groove 10. This helps nest the sealing ring 4 in the sealing groove 6 and install and position the sealing ring 4. Further, when the sealing ring is in the non-compressed state, the axial length of the main body 7 is greater than that of the lip 8.

For example, the sealing ring 4 is made of an elastic material. For example, the sealing ring 4 is made of rubber, so that the sealing ring 4 can be squeezed and deformed under the action of the high-pressure fluid, thereby improving fitting strength of the sealing ring 4 with the sealing groove 6, or with the pipe 3, and improving sealing performance.

For example, based actual use demands, the inner pipe 1 is a left-right symmetrical structure, and each of the left and right parts of the inner pipe 1 is sleeved with one outer pipe 2.

In this embodiment, two sealing grooves 6 and two sealing rings 4 are disposed in one slot 5. It may be understood that, in some embodiments, in one slot 5, one or more sealing grooves 6 may be disposed, and correspondingly, one or more sealing rings 4 may be disposed, and the sealing rings 4 is nested in the corresponding sealing grooves 6.

In addition, the inner pipe 1 shown in FIG. 1 is a two-way joint with a left-right symmetrical structure. In another embodiment, the inner pipe 1 may be a three-way joint, a four-way joint, a curved joint, a threaded joint, a plug, or the like. The present disclosure is not limited to the foregoing embodiments, and persons of ordinary skill in the art can make various variations to the present disclosure within their scope of knowledge without departing from the objective of the present disclosure.

FIG. 4 to FIG. 7 show sectional and perspective views of a sealing structure according to a second embodiment of the present disclosure. Some differences between the second embodiment and the first embodiment are mainly described herein.

Figure 4:
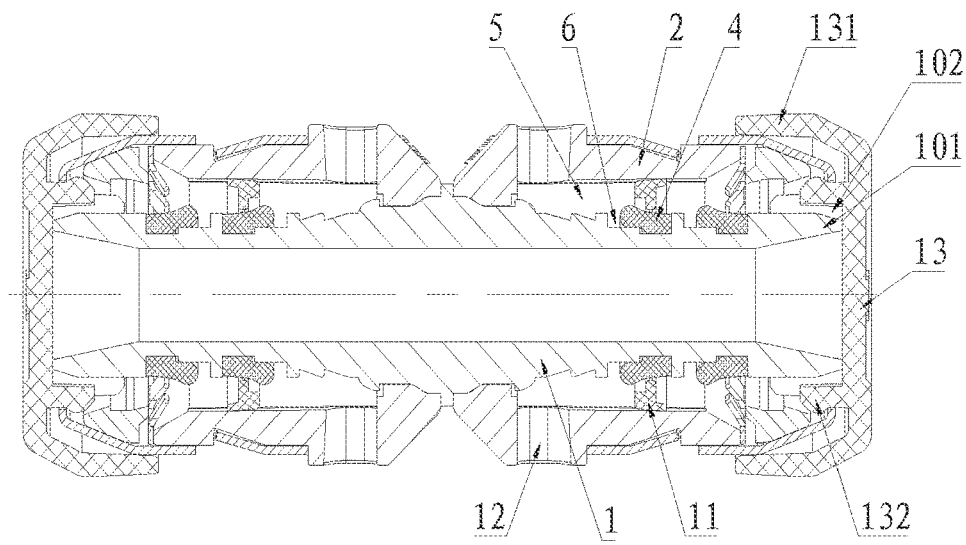
FIG. 4 is a sectional view of a sealing structure according to a second embodiment of the present disclosure.
Figure 7:
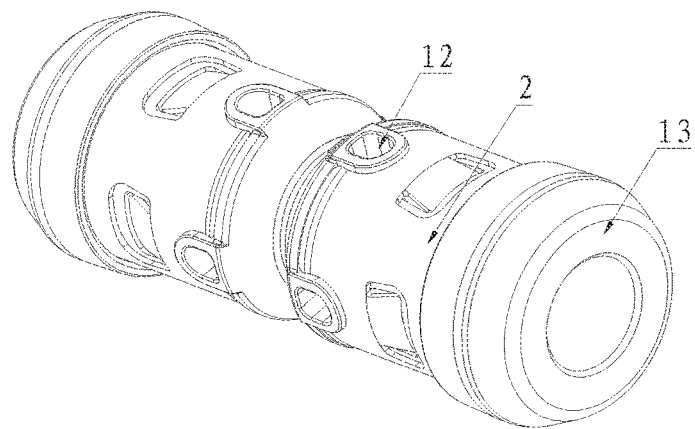
FIG. 7 is a perspective view of the sealing structure in FIG. 4.

As shown in FIG. 4 and FIG. 7, the sealing structure further includes a protective cover 13. The protective cover 13 is detachably installed at the inserting end of the inner pipe 1 and the second end of the outer pipe 2, and is configured to close the opening 102 of the slot 5 and the end of the inner pipe 1. The protective cover 13 provides protection during transportation, and can prevent impurities from entering the inner pipe 1 and the slot 5, thereby ensuring a subsequent sealing effect. The protective cover 13 can be removed when the pipe 3 needs to be connected. In FIG. 4, the protective cover 13 includes an outer ring 131 sleeved on the outer pipe 2 and an inner ring 132 clamped in the opening 102. Certainly, in another embodiment, the protective cover 13 may alternatively be implemented in another manner.

Figure 5:
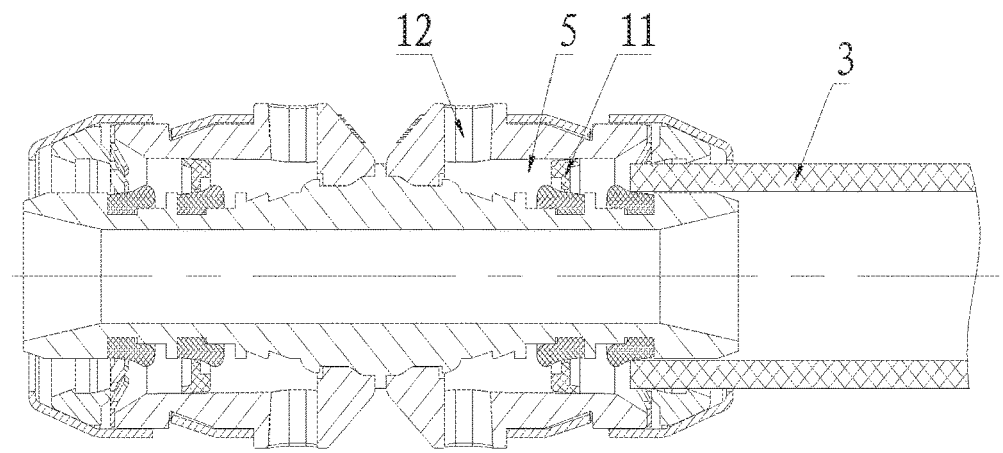
FIG. 5 is a sectional view of the sealing structure when inserting a pipe without a protective cover in FIG. 4.
Figure 6:
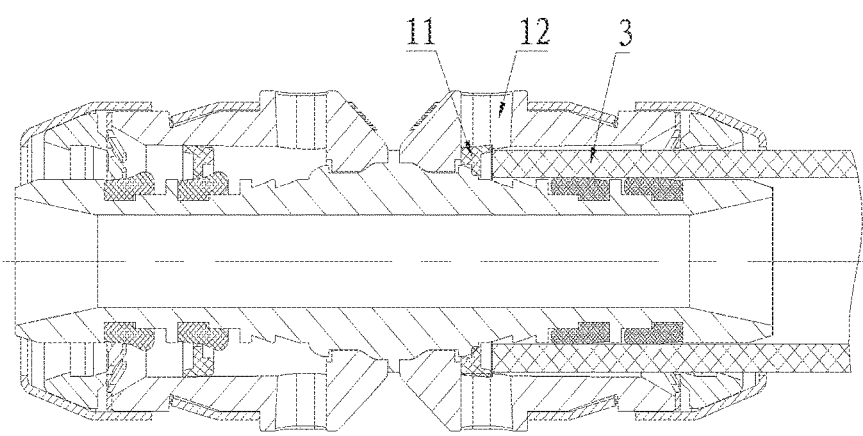
FIG. 6 is another sectional view of the sealing structure when inserting a pipe without a protective cover in FIG. 4.

As shown in FIG. 5, the sealing structure further includes an indication ring 11, and the indication ring 11 is nested in the slot 5. When the pipe 3 is inserted into the slot 5, the indication ring 11 is pushed by an end of the pipe 3 to the bottom of the slot 5 after crossing lips 8 of the sealing rings 4, as shown in FIG. 6. The outer pipe 2 is provided with an observation hole 12. The observation hole 12 is configured to observe whether the indication ring 11 is moved into the position where it should be, to determine whether the pipe 3 is inserted into the position where it should be. For example, when a user observes the indication ring 11 through the observation hole 12, it indicates that the pipe is inserted into the position where it should be. The indication ring 11 may be a colored indication ring, and has a color that can be easily observed.

Figure 8:
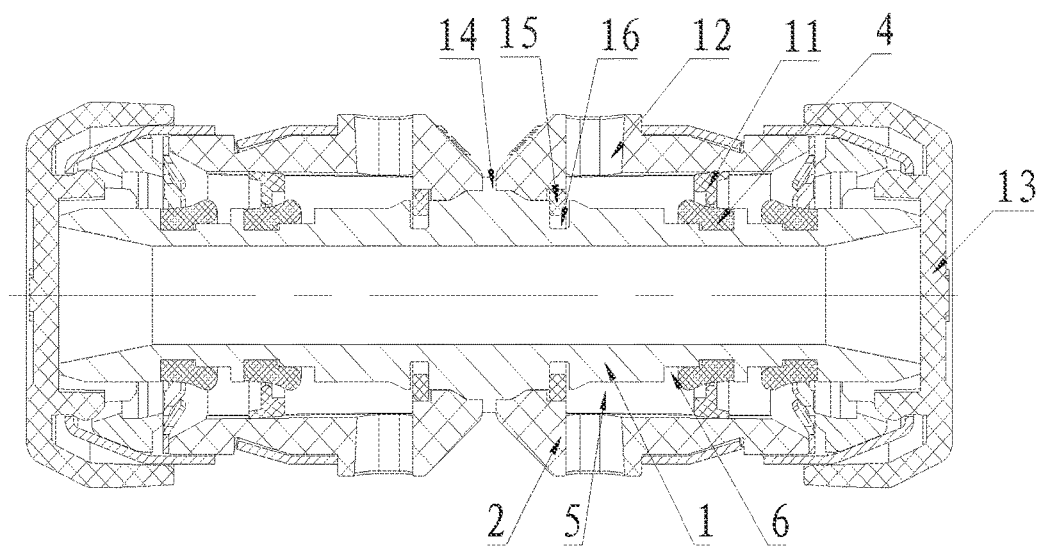
FIG. 8 is a sectional view of a sealing structure according to a third embodiment of the present disclosure.
Figure 9:
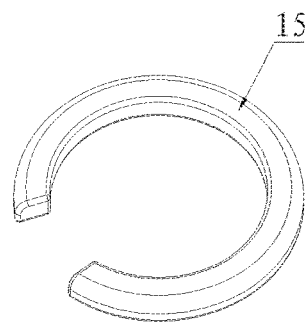
FIG. 9 is a perspective view of a snap ring of the sealing structure in FIG. 8.

FIG. 8 and FIG. 9 show a sectional view and a part-based perspective view of a sealing structure according to a third embodiment of the present disclosure. Some differences between the third embodiment and the second embodiment are mainly described herein.

The outer wall of the inner pipe 1 is provided with a flange 14 and a clamping groove 16 that are axially spaced, an elastic snap ring 15 is installed in the clamping groove 16. For example, the flange 14 is disposed outside the slot 5, and the elastic snap ring 15 is disposed inside the slot 5. The first end of the outer pipe 2 is provided with a part clamped between the flange 14 and the elastic snap ring 15. When the outer pipe 2 is installed, the first end of the outer pipe 2 is sleeved on the inner pipe 1 through the inserting end 101, then the elastic snap ring 15 is compressed and close to the flange 14, and finally the elastic snap ring 15 is released after being pressed against the flange 14, and a shape of the elastic snap ring 15 is automatically restored. This can effectively prevent the outer pipe 2 from falling off the inner pipe 1.

It should be noted that, although the outer pipe 2 and the inner pipe 1 are detachably connected in the foregoing embodiments, the outer pipe 2 and the inner pipe 1 may be of an integral structure in another embodiment.

In the description of the present disclosure, it should be noted that, unless otherwise clearly specified and limited, meanings of terms "install", "connected with", and "connected to" should be understood in a board sense. For example, the connection may be a fixed connection, a detachable connection, or an integral connection; may be a mechanical connection or an electrical connection; may be a direct connection or an indirect connection by using an intermediate medium; or may be intercommunication between two components. Persons of ordinary skill in the art may understand specific meanings of the foregoing terms in the present disclosure based on a specific situation.

The above merely describes preferred implementations of the present disclosure. It should be noted that, several improvements and replacements may be made by persons of ordinary skill in the art without departing from the principle of the present disclosure, and these improvements and replacements should also be considered within the protection scope of the present disclosure.

The invention claimed is:

1. A sealing structure, comprising an inner pipe, an outer pipe, and a sealing ring, wherein the outer pipe is detachably sleeved on the inner pipe, a slot for inserting a pipe is formed between an inner wall of the outer pipe and an outer wall of the inner pipe, and the outer wall of the inner pipe is provided with a sealing groove for placing the sealing ring; the sealing ring comprises a main body provided with a lip; the sealing groove comprises a first sealing groove and a second sealing groove, the first sealing groove and the second sealing groove are stepped, and a depth of the first sealing groove is less than that of the second sealing groove; the bottom of the lip fits the bottom of the first sealing groove, a thickness of the lip in a non-compressed state is greater than the depth of the first sealing groove, and a width of the lip in the non-compressed state is less than that of the first sealing groove; and the bottom of the main body fits the bottom of the second sealing groove, and a thickness of the main body in the non-compressed state is less than or equal to the depth of the second sealing groove; and the sealing structure comprises an indication ring disposed inside the slot, wherein the indication ring is pushed by the pipe to cross the lip, and the outer pipe is provided with an observation hole for observing whether the indication ring is moved into the position where it should be.

2. The sealing structure according to claim 1, wherein a width of the main body in the non-compressed state is less than that of the second sealing groove, and/or a cross-section of the lip is round, square, or triangular.

3. The sealing structure according to claim 1, further comprising the pipe, wherein the pipe is clamped between the outer pipe and the inner pipe.

4. The sealing structure according to claim 1, wherein the sealing ring is made of an elastic material.

5. The sealing structure according to claim 1, wherein the inner pipe is a left-right symmetrical structure, and each of the left and right parts of the inner pipe is sleeved with one outer pipe.

6. The sealing structure according to claim 1, wherein there are a plurality of sealing grooves and correspondingly, a plurality of sealing rings.

7. A sealing structure, comprising an inner pipe and at least one sealing ring, wherein an outer wall of the inner pipe is provided with at least one sealing groove, each sealing ring is nested in a corresponding sealing groove, and the inner pipe can be sealingly connected, through compressive deformation of the sealing ring, to a pipe inserted outside the inner pipe;

the sealing ring comprises a main body and a lip extending along an inserting direction of the pipe from a radially inner side of a first end of the main body; the sealing groove comprises a first sealing groove and a second sealing groove, the lip is nested in the first sealing groove, and the main body is nested in the second sealing groove; and a step for preventing an axial movement of the main body is formed between the first sealing groove and the second sealing groove;

when the sealing ring is in a non-compressed state, an outer diameter of a second end of the main body is less than an inner diameter of the pipe, a maximum outer diameter of the lip is greater than the inner diameter of the pipe, and an axial length of the lip is less than a width of the first sealing groove; and a peripheral wall of the sealing ring is provided with a guide surface for guiding insertion of the pipe, and the guide surface is disposed between a position indicated by the maximum outer diameter of the lip and the second end of the main body;

when the sealing ring is compressed by the pipe, the lip is squeezed, and has a first sealing surface in contact with a bottom surface of the first sealing groove and a second sealing surface in contact with an inner wall of the pipe;

the sealing structure comprises an outer pipe, wherein a first end of the outer pipe is connected to the inner pipe, a slot is formed between an inner wall of the outer pipe and the outer wall of the inner pipe, and a second end of the outer pipe is separated from an end of the inner pipe to form an opening for inserting the pipe into the slot; and the sealing structure comprises an indication ring disposed inside the slot, wherein the indication ring is pushed by the pipe to cross the lip, and the outer pipe is provided with an observation hole for observing whether the indication ring is moved into the position where it should be.

8. The sealing structure according to claim 7, wherein the guide surface is a truncated cone surface or an arc surface, or the guide surface is composed of a truncated cone surface and an arc surface.

9. The sealing structure according to claim 7, further comprising the pipe, wherein the pipe is inserted into the slot and clamped between the outer pipe and the inner pipe, and the sealing ring is squeezed by the pipe and is in a compressed state.

10. The sealing structure according to claim 7, wherein when the sealing ring is in the non-compressed state, an axial length of the main body is less than a width of the second sealing groove.

11. The sealing structure according to claim 7, wherein when the sealing ring is in the non-compressed state, a surface of a free end of the lip is a curved surface, an inner surface of the lip has a cylindrical surface that fits the bottom surface of the first sealing groove, and the first sealing surface comprises the cylindrical surface.

12. The sealing structure according to claim 7, wherein the first end of the outer pipe is detachably connected to the inner pipe.

13. The sealing structure according to claim 12, wherein the outer wall of the inner pipe is provided with a flange and a clamping groove that are axially spaced, an elastic snap ring is installed in the clamping groove, and the first end of the outer pipe is provided with a part clamped between the flange and the elastic snap ring.

14. The sealing structure according to claim 13, wherein the flange is disposed outside the slot, and the elastic snap ring is disposed inside the slot.

15. The sealing structure according to claim 7, wherein the outer pipe and the inner pipe are of an integral structure.

16. The sealing structure according to claim 7, wherein the indication ring is a colored indication ring.

17. The sealing structure according to claim 7, further comprising a protective cover for closing an opening of the slot and ends of the inner pipe.

\* \* \* \* \*